US 7,689,548 B2

(12) United States Patent
Li et al.

(10) Patent No.: US 7,689,548 B2
(45) Date of Patent: Mar. 30, 2010

(54) RECOMMENDING KEYWORDS BASED ON BIDDING PATTERNS

(75) Inventors: Ying Li, Bellevue, WA (US); Honghua (Kathy) Dai, Sammamish, WA (US); Lee Wang, Kirkland, WA (US)

(73) Assignee: Microsoft Corporation, Redmond, WA (US)

(*) Notice: Subject to any disclaimer, the term of this patent is extended or adjusted under 35 U.S.C. 154(b) by 512 days.

(21) Appl. No.: 11/534,567

(22) Filed: Sep. 22, 2006

(65) Prior Publication Data

US 2008/0077585 A1    Mar. 27, 2008

(51) Int. Cl.
G06F 7/00 (2006.01)

(52) U.S. Cl. .................. 707/3; 707/1; 707/2; 707/4; 707/5; 707/6; 705/37

(58) Field of Classification Search .............. 707/1, 707/2, 3, 4, 5, 6; 705/37
See application file for complete search history.

(56) References Cited

U.S. PATENT DOCUMENTS

| | | | |
|---|---|---|---|
| 6,269,361 B1 * | 7/2001 | Davis et al. ............ | 707/3 |
| 6,381,597 B1 | 4/2002 | Lin | |
| 6,704,727 B1 | 3/2004 | Kravets | |
| 7,092,901 B2 | 8/2006 | Davis et al. | |
| 7,225,182 B2 | 5/2007 | Paine et al. | |
| 7,260,568 B2 * | 8/2007 | Zhang et al. ........... | 707/3 |
| 7,272,594 B1 | 9/2007 | Lynch et al. | |
| 7,281,042 B2 * | 10/2007 | Hsu et al. .............. | 709/224 |
| 7,428,529 B2 * | 9/2008 | Zeng et al. ............ | 707/3 |
| 2002/0099605 A1 | 7/2002 | Weitzman et al. | |
| 2002/0138528 A1 | 9/2002 | Gong et al. | |
| 2003/0088525 A1 * | 5/2003 | Velez et al. ............ | 705/400 |
| 2003/0126250 A1 | 7/2003 | Jhanji | |
| 2004/0059632 A1 | 3/2004 | Kang et al. | |
| 2004/0249709 A1 * | 12/2004 | Donovan et al. ........ | 705/14 |
| 2004/0267725 A1 | 12/2004 | Harik | |

(Continued)

FOREIGN PATENT DOCUMENTS

WO    2005109271    11/2005

(Continued)

OTHER PUBLICATIONS

"Keyword Tool," via web site https://adwords.google.com/select/KeywordToolExternal.

(Continued)

*Primary Examiner*—Hung Q Pham
(74) *Attorney, Agent, or Firm*—Shook, Hardy & Bacon LLP (57) ABSTRACT

Techniques for cross-selling keywords among keyword bidding entities (e.g., advertisers) based upon bidding patterns are provided. Utilizing a keyword suggestion tool in accordance with one embodiment, upon receipt of a first keyword, may examine all additional keywords that have been paired with the first keyword in the bidding patterns of other bidding entities and recommend one or more of the paired keywords to the bidding entity for consideration. In another embodiment, a keyword suggestion tool, upon receipt of a keyword from a first bidding entity, may examine the bidding pattern of the first bidding entity in comparison to the bidding patterns of other bidding entities to identify bidding entities that are similar to the bidding entity. Recommendations may then be made to the first bidding entity based upon keywords that the identified similar bidding entities have bid.

7 Claims, 9 Drawing Sheets

U.S. PATENT DOCUMENTS

| | | | |
|---|---|---|---|
| 2005/0086206 A1 | 4/2005 | Balasubramanian et al. | |
| 2005/0091111 A1 | 4/2005 | Green et al. | |
| 2005/0102270 A1 | 5/2005 | Risvik et al. | |
| 2005/0137939 A1 | 6/2005 | Calabria et al. | |
| 2005/0144065 A1 | 6/2005 | Calabria et al. | |
| 2005/0171932 A1 | 8/2005 | Nandhra | |
| 2005/0222901 A1 | 10/2005 | Agarwal et al. | |
| 2005/0228797 A1 | 10/2005 | Koningstein et al. | |
| 2005/0262428 A1 | 11/2005 | Little et al. | |
| 2006/0020607 A1 | 1/2006 | Patterson | |
| 2006/0200445 A1* | 9/2006 | Chen et al. | 707/2 |
| 2007/0027864 A1* | 2/2007 | Collins et al. | 707/5 |
| 2007/0027865 A1* | 2/2007 | Bartz et al. | 707/5 |
| 2007/0038602 A1* | 2/2007 | Weyand et al. | 707/3 |
| 2007/0100795 A1* | 5/2007 | Davies | 707/3 |
| 2007/0203894 A1* | 8/2007 | Jones et al. | 707/3 |
| 2007/0288454 A1* | 12/2007 | Bolivar et al. | 707/5 |

OTHER PUBLICATIONS

"Finding Keywords with Global Promoter's Free Keyword Generator Tool Keyword Suggestion Tool: Finding Keywords the Easy Way," via web site http://www.globalpromoter.com/seo-tools/keyword-suggestion-tool.cfm.

"Keyword Investigator," via web site http://www.keywordinvestigator.com/keyword-investigator.htm.

Gagan Aggarwal et al., "Truthful Auctions for Pricing Search Keywords", Mar. 12, 2006 (in conjunction with the ACM Conference on Electronic Commerce).

Kevin Bartz et al., "Logistic Regression and Collaborative Filtering for Sponsored Search Term Recommendation", Electronic Commerce '06, Jun. 11-15, 2006.

International Search Report and Written Opinion dated Jan. 14, 2008.

* cited by examiner

| 510 | KEYWORDS CROSS SELL DEMO | | 516 |
|---|---|---|---|
| TYPE KEYWORD: [AROMATHERAPY] | | SUGGEST [20] | KEYWORDS |
| STEP 1: ADD KEYWORD TO BIDDING LIST | | STEP 2: SUGGEST KEYWORD | |
| 512 YOUR BIDDING LIST: [CLEAR BIDDING LIST] | | KEYWORDS THAT SIMILAR ADVERTISERS CONSIDER 520 | |
| AROMATHERAPY<br><br>514 | | TAROT<br>ASTROLOGY<br>ASTROLOGA<br>HOROSCOPE<br>STARS<br>HOROSCOPES<br>ARIES<br>ASTROLOGIA<br>LIBRA<br>TOPAS<br>FREE TAROT READING<br>DAILY HOROSCOPE<br>YOGA<br>FREE HOROSCOPES<br>NUMEROLOGY<br>PSYCHICS<br>PSYCHIC<br>VIRGO<br>HOROSCOPO<br>DREAM INTERPRETATION | 518 |

| 1010 | KEYWORDS CROSS SELL DEMO | 1016 |
| --- | --- | --- |

TYPE KEYWORD: VISION          SUGGEST 20 KEYWORDS

| STEP 1: ADD KEYWORD TO BIDDING LIST | STEP 2: SUGGEST KEYWORD |
| --- | --- |
| 1012 YOUR BIDDING LIST:<br>CLEAR BIDDING LIST | KEYWORDS THAT SIMILAR ADVERTISERS CONSIDER 1020 |
| ACUVUE<br>EYE DOCTOR<br>VISION<br><br><br><br>1014 | CONTACTS<br>CONTACT LENSES ONLINE<br>CONTACT LENSES<br>BAUSCH LOMB<br>BAUSCH AND LOMB<br>BUY CONTACT LENSES<br>CONTACT LENS<br>BUY CONTACT LENSES<br>CONTACT LENSE          1018<br>BIOMEDICS<br>FRESHLOOK<br>EYE CONTACTS<br>ACUVUE 2<br>ACUVUE 2 CONTACT LENS<br>ACUVUE CONTACT LENS<br>DISCOUNT CONTACT LENS<br>BAUSCH & LOMB<br>ACUVIEW CONTACT LENSES<br>DISCOUNT CONTACT LENSES<br>CHEAP CONTACT LENS |

*FIG. 10.*

RECOMMENDING KEYWORDS BASED ON BIDDING PATTERNS

BACKGROUND

In the paid search advertising industry, content and context are the primary criteria utilized to measure similarity between keywords. As such, these two measures are commonly used in keyword suggestion tools, that is, tools that suggest to an entity (e.g., an advertiser) upon receipt of a first keyword, one or more additional keywords upon which it may want to consider placing a bid as well. For example, if an advertiser places a bid on the keyword "vehicle", a keyword suggestion tool may also suggest words having similar meaning, e.g., "automobile", "motorcycle", "bus", and the like.

While additional keyword suggestion is beneficial to advertisers seeking to place keywords, content and/or context similarity keyword suggestions provide an advertiser with fairly limited information from which to evaluate their keyword bidding strategies. Additionally, referring back to the above examples the suggested keywords are often words or terms that the advertiser likely could have formulated on their own, simply by being intimately involved in their specific industry.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments of the present invention relate to techniques for cross-selling keywords among keyword bidding entities (e.g., advertisers) based upon bidding patterns. For instance, a keyword suggestion tool in accordance with an embodiment of the present invention, upon receipt of a first keyword, may examine all additional keywords that have been paired with the first keyword in the bidding patterns of other advertising entities and recommend one or more of the paired keywords to the bidding entity for consideration. In other embodiments, a keyword suggestion tool in accordance with the present invention, upon receipt of a keyword/keywords from a first advertising entity, may examine the bidding pattern of the first advertising entity in comparison to the bidding patterns of other advertising entities to identify advertising entities that are similar to the bidding entity. Recommendations may then be made to the first advertising entity based upon keywords that the identified similar advertising entities have bid.

BRIEF DESCRIPTION OF THE SEVERAL VIEWS OF THE DRAWINGS

The present invention is described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments the present invention provides techniques for cross-selling keywords among keyword bidding entities (e.g., advertisers) based upon bidding patterns. In one aspect, a keyword suggestion tool in accordance with an embodiment of the present invention, upon receipt of a keyword from a first advertising entity, examines all additional keywords that any single advertising entity that has bid upon the first keyword has also bid upon, and recommends one or more of the paired keywords to the first advertising entity for consideration. In another aspect, a keyword suggestion tool in accordance with an embodiment of the present invention, upon receipt of a keyword from a first advertising entity, examines the bidding pattern of the first advertising entity in comparison to the bidding patterns of other advertising entities to identify advertising entities that are similar to the bidding entity. Recommendations may then be made to the first advertising entity based upon keywords that the identified similar advertising entities have bid, even if the similar advertising entities have not bid upon the keyword upon which the first advertising entity is presently bidding.

Accordingly, in one embodiment, the present invention relates to a method for recommending keywords based upon keyword bid patterns. The method includes receiving a first keyword bid upon by a first entity; retrieving at least one bid pattern associated with a plurality of entities, the at least one bid pattern including at least one second keyword paired with the first keyword; determining if the first entity has bid upon the at least one second keyword; and, if it is determined that the first entity has not bid upon the at least one second keyword, presenting the second keyword to the first entity.

In another embodiment, the present invention relates to a method for recommending keywords based on bidding entity similarity. The method includes receiving a first keyword bid upon by a first entity; identifying at least one of a plurality of other entities that is similar to the first entity; determining at least one significant keyword bid upon by the at least one of the plurality of other entities that is similar to the first entity; and presenting the at least one significant keyword to the first entity.

Embodiments of the present invention further relate to computer-readable media having computer-executable instructions embodied thereon for performing the methods described herein.

In yet another embodiment, the present invention relates to a computerized system for recommending keywords. The system includes a keyword receiving component configured to receive at least one keyword bid upon by a first entity; a bidding history determining component configured to determine a bidding history associated with the first entity and each of the plurality of other entities; and a suggested keyword presentation component configured to present at least one suggested keyword to the first entity based upon the bidding history associated with the first entity and the bidding history associated with the at least one of the plurality of other entities.

Having briefly described an overview of embodiments of the present invention, an exemplary operating environment suitable for use in implementing embodiments of the present invention is described below.

Figure 1:
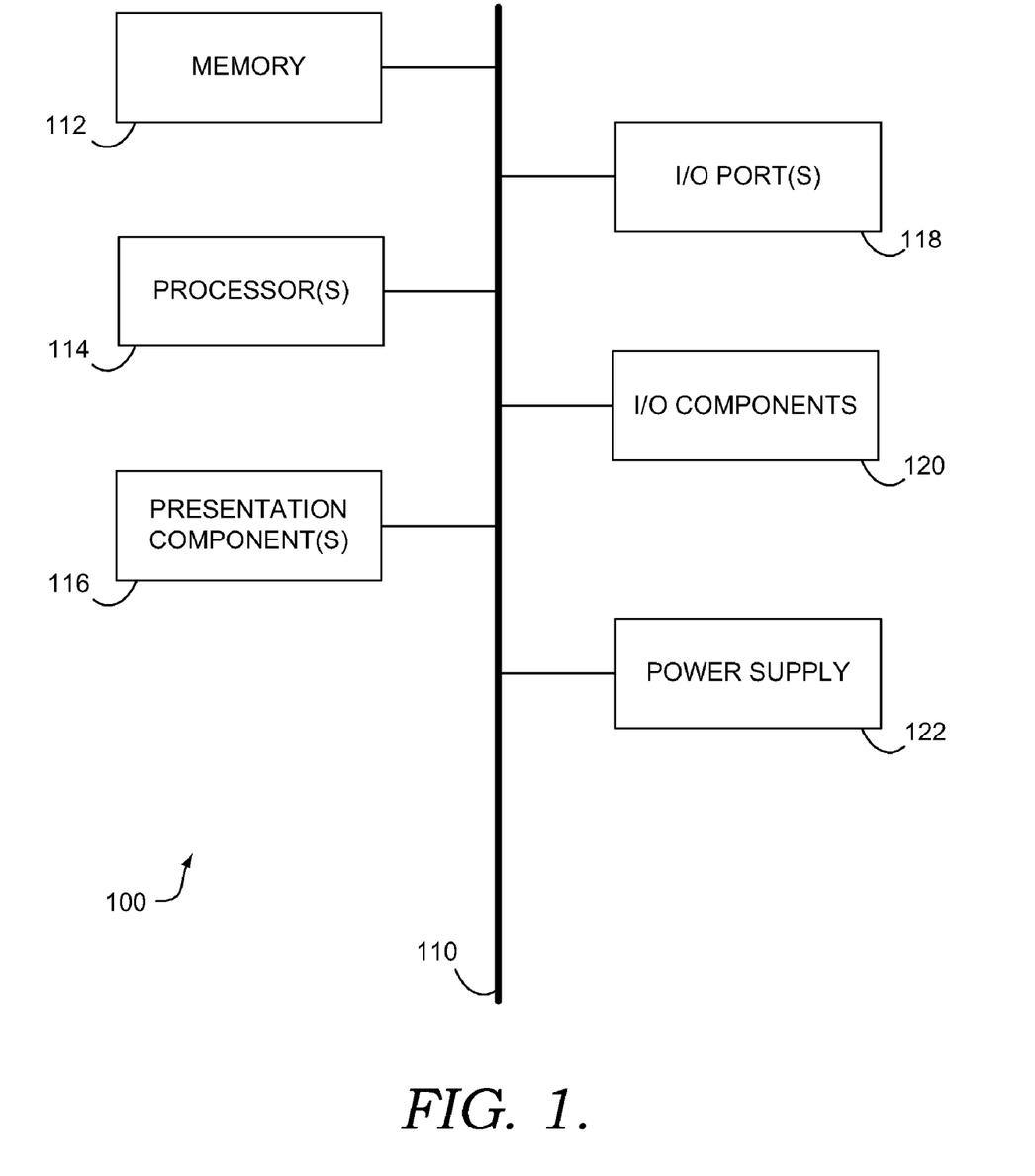
FIG. 1 is a block diagram of an exemplary computing environment suitable for use in implementing embodiments of the present invention.

Referring initially to FIG. 1 in particular, an exemplary operating environment for implementing the present invention is shown and designated generally as computing device 100. Computing device 100 is but one example of a suitable computing environment and is not intended to suggest any limitation as to the scope of use or functionality of the invention. Neither should the computing-environment 100 be interpreted as having any dependency or requirement relating to any one or combination of components illustrated.

The invention may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. By way of example, and not limitation, computer-readable media may comprises Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, carrier wave or any other medium that can be used to encode desired information and be accessed by computing device 100.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

As previously mentioned, in one embodiment, the present invention relates to techniques for cross-selling keywords among keyword bidding entities (e.g., advertisers) based upon bidding patterns. For instance, a keyword suggestion tool in accordance with an embodiment of the present invention, upon receipt of a first keyword, may examine all additional keywords that have been paired with the first keyword in the bidding patterns of other advertising entities and recommend one or more of the paired keywords to the bidding entity for consideration. In other embodiments, a keyword suggestion tool in accordance with the present invention, upon receipt of a keyword from a first advertising entity, may examine the bidding pattern of the first advertising entity in comparison to the bidding patterns of other advertising entities to identify advertising entities that are similar to the bidding entity. Recommendations may then be made to the first advertising entity based upon keywords that the identified similar advertising entities have bid.

Figure 2:
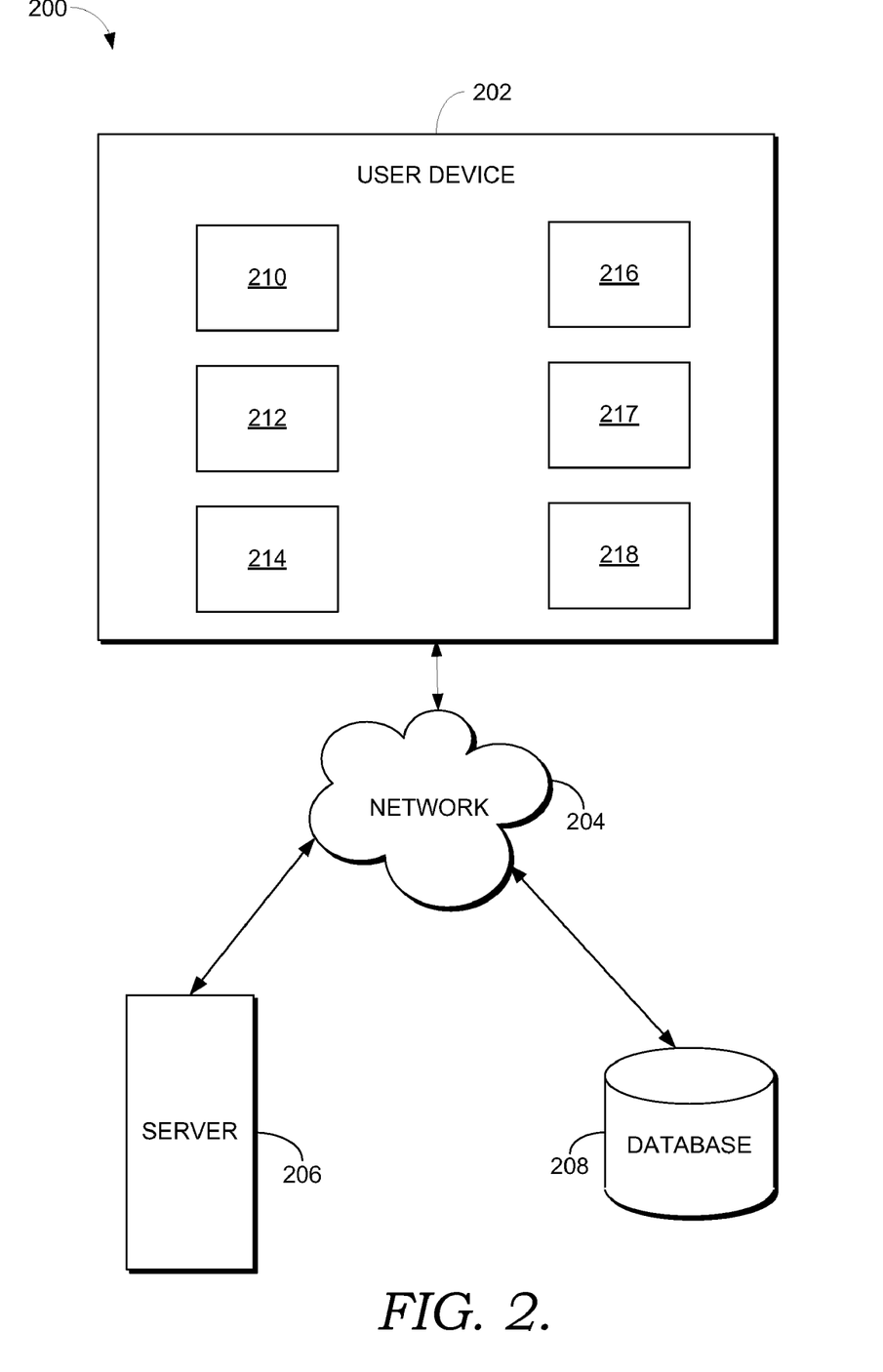
FIG. 2 is a block diagram of an exemplary computing system suitable for use in implementing embodiments of the present invention.

Referring now to FIG. 2, a block diagram is illustrated that shows an overall system architecture 200 for recommending keywords in accordance with embodiments of the present invention. It will be understood and appreciated by those of ordinary skill in the art that the overall system architecture 200 shown in FIG. 2 is merely an example of one suitable computing environment and is not intended to suggest any limitation as to the scope of use or functionality of the present invention. Neither should the overall system architecture 200 be interpreted as having any dependency or requirement related to any single component or combination of components illustrated therein.

System 200 includes a user device 202 connected to a server 206 and a database 208 via a network 206. Each of the user device 202 and the server 206 shown in FIG. 2 may be any type of computing device, such as, for example, computing device 100 described above with reference to FIG. 1. By way of example only and not limitation, the user device 202 and/or the server 206 may be a personal computer, desktop computer, laptop computer, handheld device, consumer electronic device, and the like. It should be noted, however, that the invention is not limited to implementation on such computing devices, but may be implemented on any of a variety of different types of computing devices within the scope of embodiments of the present invention.

As shown in FIG. 2, the user device 202 includes keyword (s) receiving component 210, a bid pattern determining component 212, a suggested keyword(s) presentation component 214, a confidence value determining component 216, a bidding entity similarity determining component 218, and a keyword significance determining component 220 for implementing embodiments of the present invention. In some embodiments, the components 210, 212, 214, 216, 218, and 220 may be implemented as stand-alone applications. In other embodiments, the components 210, 212, 214, 216, 218, and 220 may be integrated directly into the operating system for the user device 202. It will be understood by those skilled in the art that the components 210, 212, 214, 216, 218, and 220 illustrated in FIG. 2 are exemplary in nature and in number and should not be construed as limiting. Any number of components may be employed to achieve the desired functionality within the scope of embodiments of the present invention.

The keyword(s) receiving component 210 is configured for receiving one or more keywords input by a user at the user device 202, each keyword received being a keyword upon which the user desires to place a bid. By way of example only, a keyword input by the user may be a single term, a phrase including a plurality of terms, a product name, a brand name, or the like. Typically, the user will be an individual authorized to place bids on keywords on behalf of a bidding entity, for instance, an advertising entity. In one embodiment, the keyword(s) receiving component 210 is further configured for transmitting received keywords (in addition to an identifier associated with the bidding entity, if desired) to a database 208 for storage (via network 204). It will be understood and appreciated by those of ordinary skill in the art that database 208 may be a single database as shown or a database cluster (not shown) and may be a stand alone component or integrated with either server 206 or user device 202, or any combination thereof. Additionally, in some embodiments, the server 206 may be a plurality of servers (not shown) or may not be present in the system at all. Any and all such variations are contemplated to be within the scope of embodiments hereof.

The bid pattern determining component 212 of the user device 202 is configured for determining a bidding pattern associated with the bidding entity, as well as a bidding pattern associated with one or more additional entities that have placed bids on one or more keywords at some previous point in time. In one embodiment, the bid pattern determining component is configured for determining the bidding pattern of the bidding entity and one or more additional entities relative to a particular keyword the bidding entity has input into the keyword(s) receiving component 210. For instance, if the bidding entity inputs the keyword "aromatherapy" and such keyword is received by the keyword(s) receiving component 210, the bid pattern determining component 212 may be configured for determining the bid patterns of one or more other bidding entities who have placed bids on keyword "aromatherapy" at some point in time. In this instance, the bidding pattern(s) of the one or more other bidding entities may include additional keywords on which those same bidding entities have placed bids.

In another embodiment, the bid pattern determining component 212 is configured for determining the bidding pattern of the bidding entity and one or more additional entities relative to the bidding pattern of the bidding entity. That is, the bid pattern determining component 212 may be configured for determining all keywords on which the bidding entity currently bidding upon a particular keyword has placed bids during a predefined prior time period. Additionally, the bid pattern determining component 212 may be configured for determining all keywords on which any bidding entities similar to the bidding entity currently bidding upon a particular keyword have placed bids during a predefined prior time period. Bidding entities that may be considered "similar" to the bidding entity currently bidding upon a particular keyword may be determined by the bidding entity similarity determining component 218 of user device 202, as more fully described below.

Bid pattern data associated with each of the bidding entity and one or more additional bidding entities may be stored in association with database 208 and/or server 206 and accessed by the bid pattern determining component 212 via network 204. Such bid pattern data may include, by way of example only, the keywords on which an entity has placed bids, an identifier associating the entity with the bid upon keyword, a time during which any keyword bids were placed, and the like.

The suggested keyword(s) presentation component 214 is configured to present at least one suggested keyword to the user inputting the bid upon keyword based upon the bid pattern associated with the first entity and the bid pattern associated with at least one of a plurality of other entities. Typically, presentation of the suggested keyword(s) comprises displaying the suggested keyword(s) on a display device associated with the user device 202. However, other types of presentation, such as an audible presentation, may also be provided within the scope of embodiments of the present invention.

In one embodiment, the suggested keyword(s) presentation component 214 may be configured to present one or more suggested keywords determined relative to a particular keyword the bidding entity has input into the keyword(s) receiving component 210. In another embodiment, the suggested keyword(s) presentation component 214 may be configured to present one or more suggested keyword(s) determined relative to the bidding pattern of the bidding entity and the bidding pattern(s) of one or more additional bidding entities. In one embodiment, the suggested keyword(s) presentation component 214 may be additionally configured to present the bid upon keyword in association with, for instance, a common display for ease of comparison by the user. Exemplary user interfaces which may be utilized by the suggested keyword(s) presentation component 214 for presenting one or more suggested keywords to the user, are more fully described below with reference to FIGS. 5, 6, 9, and 10.

Confidence value determining component 216 is configured to determine a confidence value associated with one or more keyword(s) bid upon by at least one entity other than the entity that is currently bidding upon a keyword. A confidence value represents the strength of a particular keyword, that is, the importance of a particular keyword among entities that have placed bids upon the currently bid upon keyword during some predefined time frame. The confidence value of a suggested keyword (k') relative to the bid upon keyword (k) may be determined as follows:

Confidence (k'|k)=Freq (k, k')÷log (Freq (k'); wherein Freq (k, k') is the frequency with which keyword (k) is bid upon by the same bidding entity that bids upon suggested keyword (k'), and Freq (k') is the frequency that suggested keyword (k') is bid upon irrespective of any association with keyword (k). The higher a confidence value of keyword k' given keyword k is, the more likely the entity that is currently bidding upon keyword k will be interested in bidding upon keyword k'.

Bidding entity similarity determining component 218 is configured to determine at least one entity that is similar to the bidding entity. The keywords that a bidding entity has placed bids upon at some point in time represent its commercial interest. Therefore, we can use a binary keyword vector (i.e., a list of keywords) to represent a bidding entities commercial interest.

Let $K=\{k_1, k_2, ,k_n\}$ be all the possible keywords in the bidding history of all bidding entities. The vector of a particular bidding entity (A) may be represented as $V_A = <\cdot w>_{K1}^A, w_{k2}^A, w_{kn}^A$, where $Wk_1=1$ if a particular keyword ($k_1$) was bid upon by bidding entity A, and $Wk_1=0$ if the particular keyword ($k_1$) has not been bid upon by bidding entity A.

Similarity between bidding entity A and bidding entity B may then be defined as:

$$Sim(A, B) = \frac{V_A \times V_B}{V_A ||V_B|} = \frac{\sum_{i=1}^{n} w_{ki}^A * w_{ki}^B}{\sqrt{\sum_{i=1}^{n} (w_{ki}^A)^2 \sum_{i=1}^{n} (w_{ki}^B)^2}}$$

A pre-specified threshold θ may be set to determine whether another bidding entity is similar to the bidding entity currently bidding upon a keyword. Bidding entities determined to be similar to bidding entity A utilizing the above formula may be defined as bidding entity A's neighborhood of bidding entities. Thus, the neighborhood of bidding entity A is a set of bidding entities defined as: Neighborhood(A) ={B|Sim(A,B)>=θ}.

It should be noted that bidding entities determined to be within bidding entity A's neighborhood need not have ever bid upon the keyword currently being bid upon by bidding entity A. Rather, the bidding entity similarity determining component 218 may be configured to compare any keyword bid upon by bidding entity A during a predetermined time frame with any keyword bid upon by one or more other bidding entities during a predetermined time frame to determine similarity in accordance with the above formula. An exemplary method for determining similarity among bidding entities is more fully described below with reference to FIG. 8.

Keyword significance determining component 220 is configured to determining significance associated with each keyword bid upon by each of a plurality of other entities that have been determined to be similar to the bidding entity (e.g., by bidding entity similarity determining component 218). For instance, suppose that utilizing the above formula, that it was determined that there are three bidding entities that are in the neighborhood of bidding entity A. Further suppose that each of the three similar bidding entities had previously placed bids upon twenty keywords. Those keywords that may be of more interest to bidding entity A and, accordingly, those keywords that are likely to be presented utilizing suggested keyword(s) presentation component 214, are those keywords that are bid upon most often, either by a single similar bidding entity or by multiple similar bidding entities. Accordingly, keyword significance determining component 220 may be configured to determine keywords as significant if they are the most frequently bid upon keywords in the bidding history of bidding entity A's neighborhood.

Once a confidence value is determined (e.g., utilizing confidence value determining component 216) and/or the significance of one or more keyword(s) is determined (e.g., utilizing keyword significance determining component 220), the suggested keyword(s) presentation component 214 may present one or more suggested keywords to the user. For instance, the suggested keyword(s) presentation component 214 may present one or more keywords having a confidence value in excess of a predetermined threshold to the user under the heading "Bidding Entities That Bid This Keyword Also Bid:" and/or one or more keywords having whose significance exceeds a predetermined threshold to the user under the heading "What Other Similar Bidding Entities Have Bid". In other embodiments, all keywords or a predefined quantity of keywords identified by bid patterns of the bidding entity and/or other bidding entities may be presented, the order of presentation being defined by confidence value and/or significance. Any and all such variations, and any combinations thereof, are contemplated to be within the scope of embodiments of the present invention.

Figure 3:
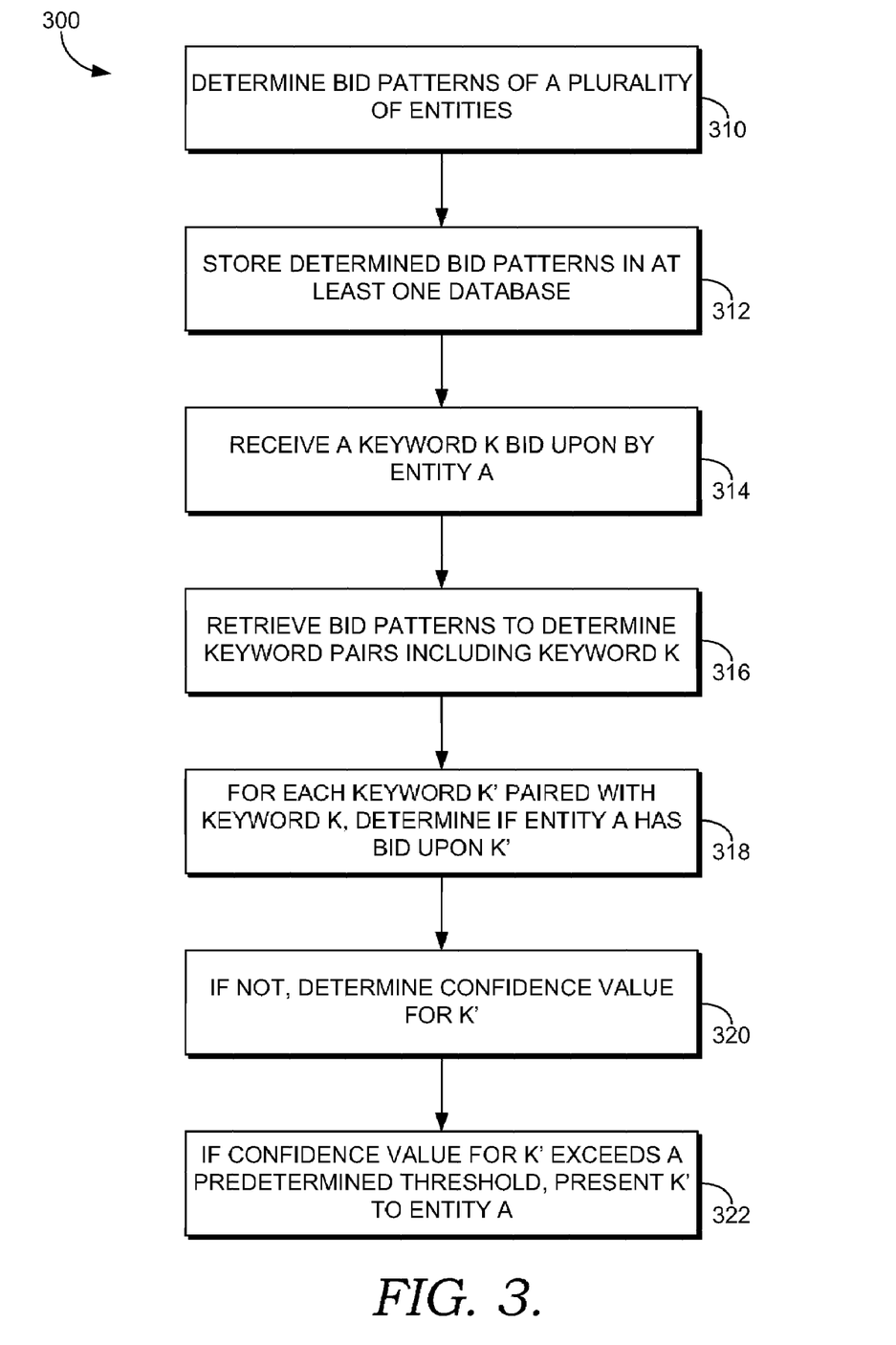
FIG. 3 is flow diagram showing a method for recommending keywords based on keyword bid patterns determined relative to one or more bid upon keywords, in accordance with an embodiment of the present invention.

Turning to FIG. 3, a flow diagram is illustrated which shows a method 300 for recommending keywords based on keyword bid patterns. Initially, as shown at block 310, keyword bid patterns associated with a plurality of bidding entities are determined. Keyword bid patterns may be determined, for instance, utilizing bid pattern determining component 212 of FIG. 2. One manner in which keyword bid patterns may be determined is illustrated by way of a flow diagram shown in FIG. 4.

Figure 4:
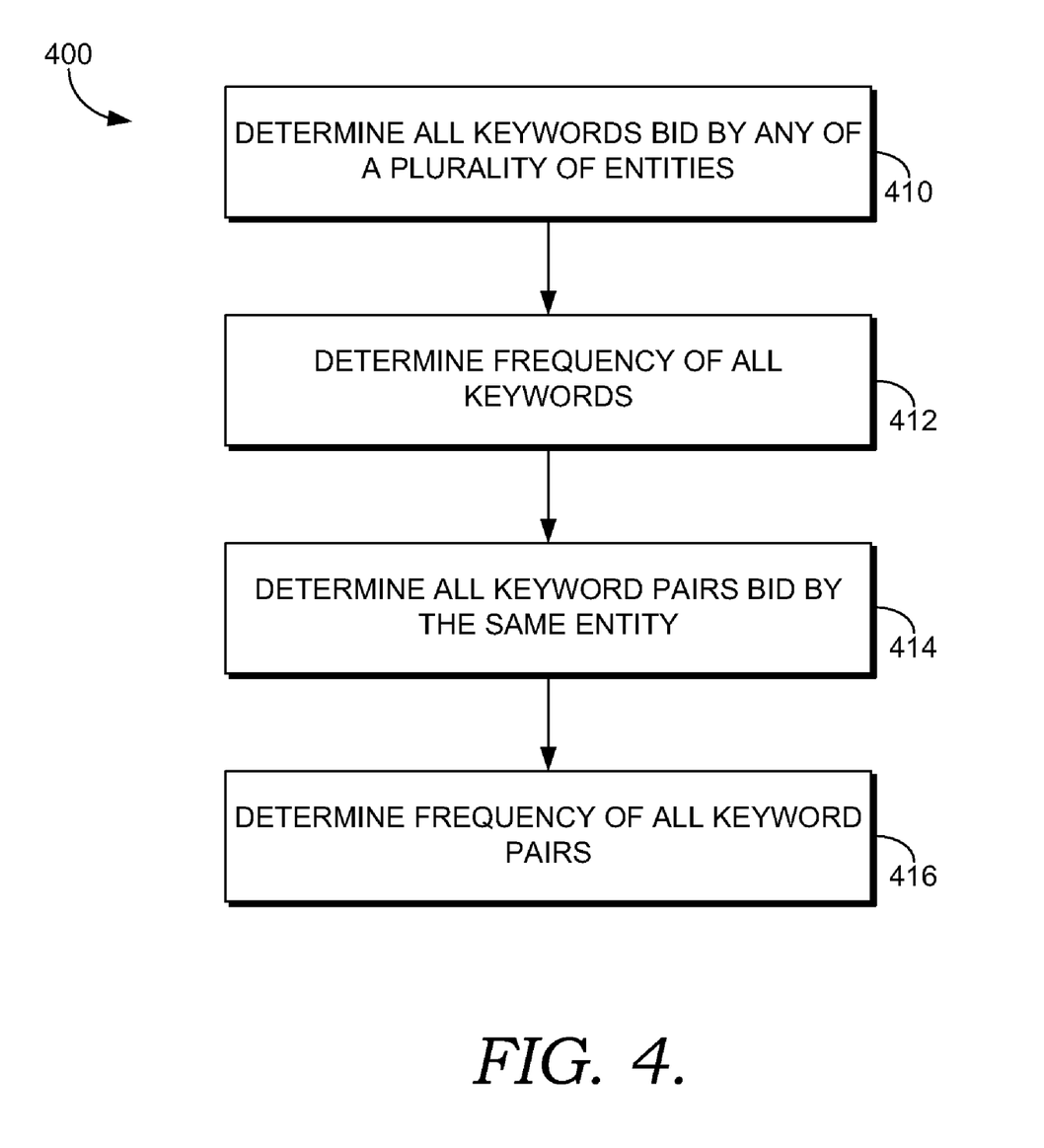
FIG. 4 is a flow diagram showing a method for determining keyword bid patterns based upon one or more bid upon keywords, in accordance with an embodiment of the present invention.

Initially, as shown at block 410, all keywords bid upon by any of a plurality of bidding entities during a configurable, predefined time frame are determined. Such determination may be made, for instance, upon the bid pattern determining component 212 of FIG. 2 retrieving such keywords from a database (e.g., database 208), server (e.g., server 206), or any combination thereof Subsequently, the frequency with which each of the keywords upon which bids have been placed are determined, as shown at block 412. Additionally determined are all keyword pairs upon which bids have been placed by the same entity. This is shown at block 414. Subsequently, the frequency with which all keyword pairs are bid upon by a single entity is determined, as shown at block 416. By way of example only, each of the keyword frequency, keyword pairs, and frequency of keyword pairs may be retrieved by the bid pattern determining component 212 from a database (e.g., database 208), server (e.g., server 206), or any combination thereof All of the retrieved information in combination may be referred to herein as bid pattern data.

Returning to FIG. 3, once the bid patterns of the plurality of entities are determined, the bid pattern data may be stored in at least one database, for instance, database 208 of FIG. 2. This is shown at block 312. Subsequently, as shown at block 314, a keyword (k) upon which an entity A desires to place a bid is received, for instance, by keyword(s) receiving component 210 of FIG. 2. Next, the bid patterns are retrieved to identify any keyword pairs that include the keyword (k), as shown at block 316. That is, the bid patterns are retrieved to identify any keyword (k') bid upon by a bidding entity that also bid upon keyword (k). Each of these keywords (k'), in combination with the bid upon keyword (k), are defined herein as a keyword pair.

For each keyword (k') that forms a keyword pair with the bid upon keyword (k), it is subsequently determined if the keyword (k') has been bid upon by entity A during a configurable, predefined time frame. This is shown at block 318. If entity A has bid upon the keyword (k'), no further action is taken with regard to the keyword (k'). However, if entity A has not placed a bid upon the keyword (k'), a confidence value is determined for the keyword (k'), as shown at block 320. As shown in accordance with method 300, if the determined confidence value for the keyword (k') exceeds a configurable predetermined threshold, the keyword (k') may be presented to entity A as a suggested or recommended keyword upon which entity A may wish to place a bid. This is shown at block 322. In one embodiment, such keyword may be displayed on a display device associated with user device 202 of FIG. 2 in association with the heading "Bidding Entities Who Bid This Keyword Also Bid:", or the like.

In another embodiment (not shown), all or a predetermined quantity of keywords that form a keyword pair with the bid upon keyword (k) may be presented rather than only those keywords having confidence values exceeding a predetermined threshold. In such embodiments, the suggested keywords may be presented in an order defined by their respective confidence values (e.g., in ascending or descending order) or presented in association with their respective confidence values. Any and all such variations are contemplated to be within the scope of embodiments of the present invention.

Figure 5:
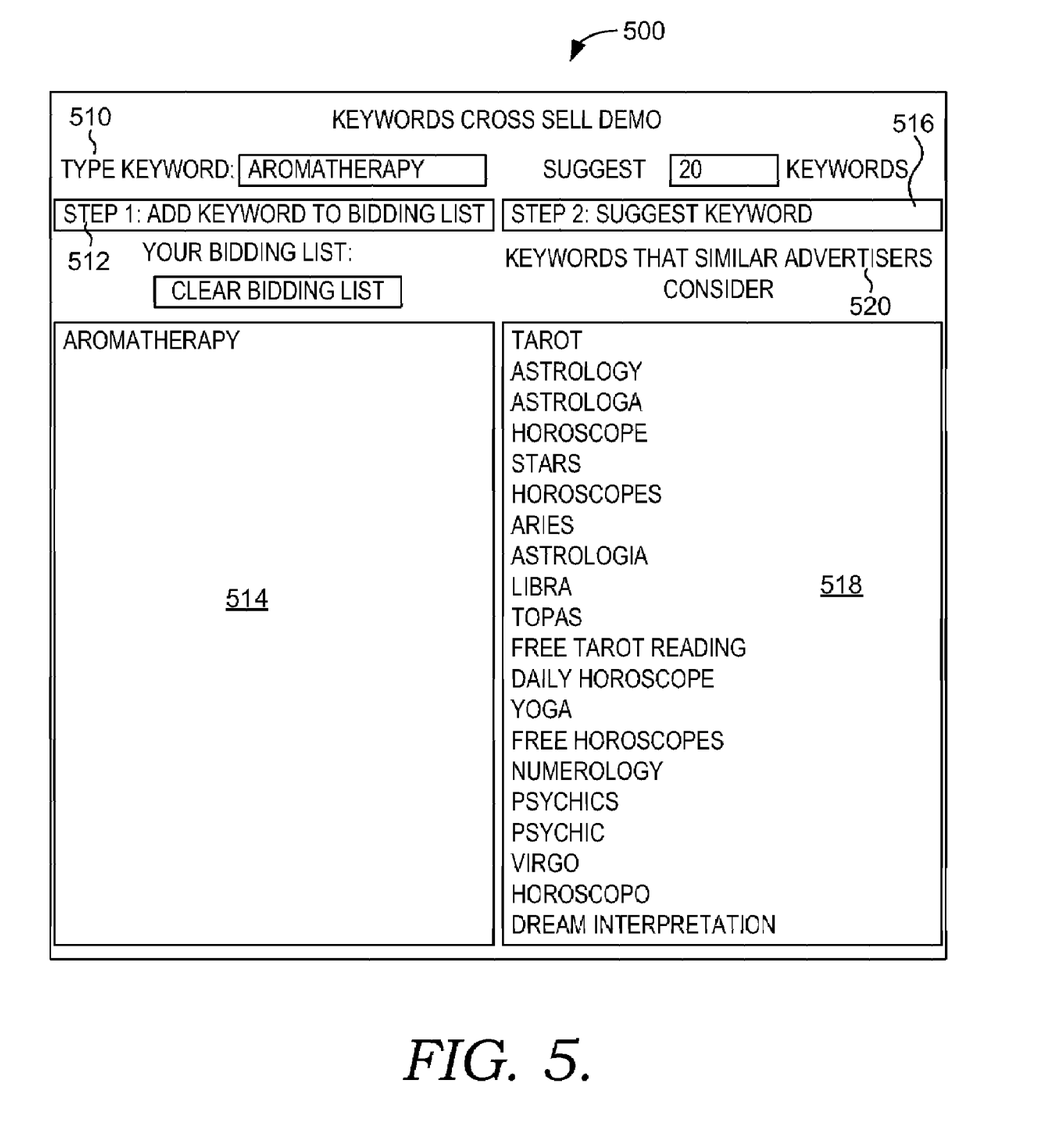
FIG. 5 is an illustrative screen display of an exemplary user interface for accepting keywords for bid and, based upon that keyword, suggesting additional keywords for consideration, wherein a single keyword has been input by a user, in accordance with an embodiment of the present invention.
Figure 6:
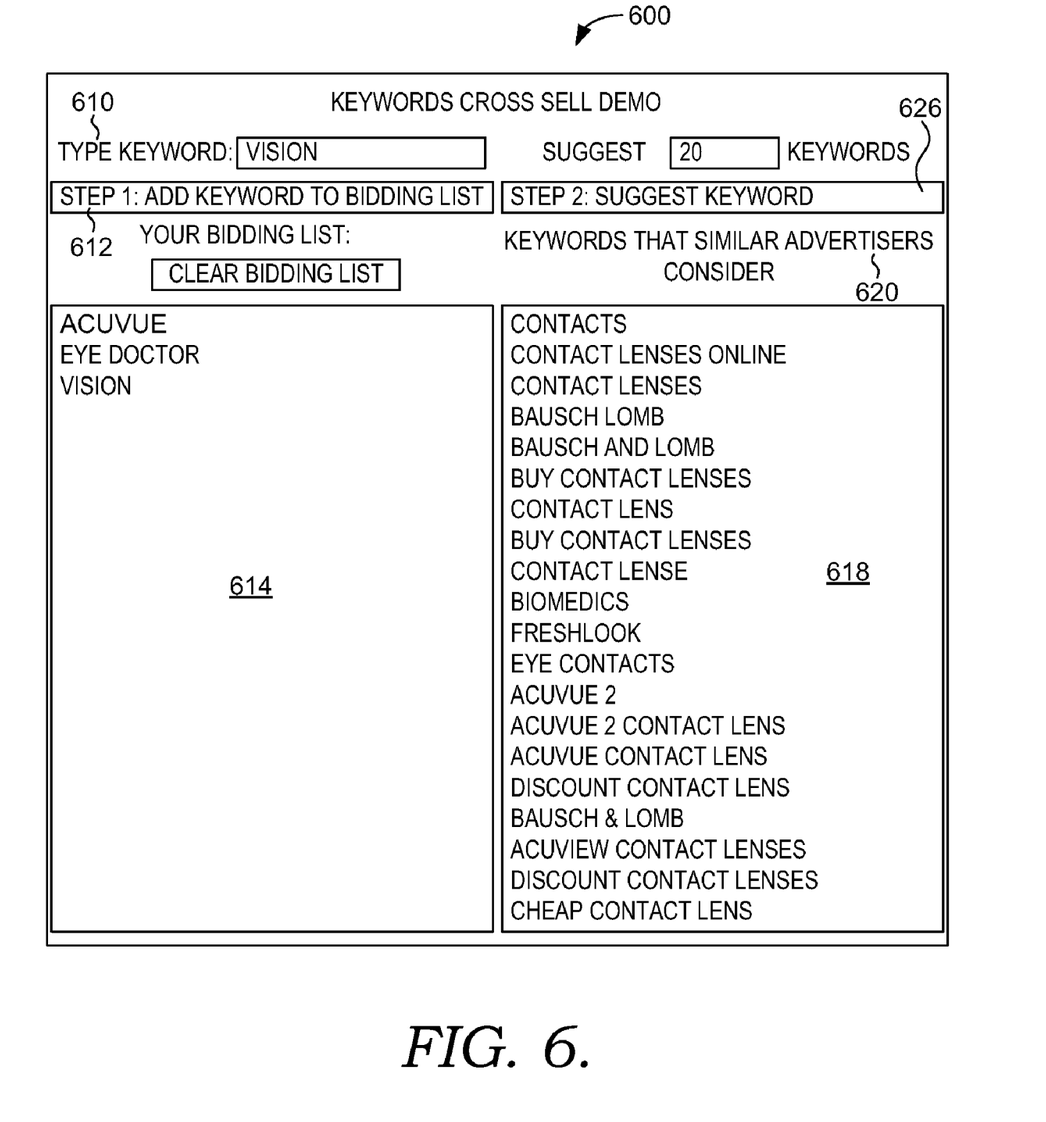
FIG. 6 is an illustrative screen display of an exemplary user interface for accepting keywords for bid and, based upon that keyword, suggesting additional keywords for consideration, wherein multiple keywords have been input by a user, in accordance with an embodiment of the present invention.

Turning now to FIGS. 5 and 6, illustrative screen displays of exemplary user interfaces for accepting one or more keywords for bid and, based upon that keyword(s), suggesting or recommending additional keywords for consideration, are shown in accordance with embodiments of the present invention. In FIG. 5, a single keyword has been input for bid and in FIG. 6, a plurality of keywords has been input for bid.

With initial reference to FIG. 5, a user interface 500 is shown having a keyword input field 510 configured to receive user input regarding keywords upon which the user would like to place a bid. Upon inputting a keyword, the user may select a selectable "Step 1: Add keyword to Bidding List" button 512 such that the desired keyword may be displayed in a bid upon keyword display area 514. The user may subsequently select a selectable "Step 2: Suggest Keywords" button 516, resulting in display of a plurality of keywords in a suggested keyword display area 518. Note in FIG. 5 that the suggested keywords are displayed under the heading "Bidding Entities That Bid This Keyword Also Bid:". Accordingly, each of the keywords that is displayed in the suggested keyword display area 518 is a keyword that was bid upon by an entity that also bid upon the keyword input in the keyword input field 510 and displayed in the bid upon keyword display area 514 within a predetermined time and that the bidding entity has not previously placed a bid upon.

Turning now to FIG. 6, a user interface 600 is shown having a keyword input field 610 configured to receive user input regarding keywords upon which the user would like to place a bid, keyword input field 610 being identical to keyword input field 510 of FIG. 5. Upon inputting a keyword, the user may select a selectable "Step 1: Add Keyword to Bidding List" button 612 such that the desired keyword may be displayed in a bid upon keyword display area 614 (bid upon keyword display area 614 being identical to bid upon keyword display area 514 of FIG. 5). In the example illustrated in FIG. 6, the user has input a plurality of keywords to bid upon. Thus, when the user selects the selectable "Step 2: Suggest Keywords" button 616, the resulting display of keywords in the suggested keyword display area 618 are keywords that have at some point within a predetermined time frame, been paired with each of the keywords the user currently desires to bid upon. Additionally, as with the suggested or recommended keyword listing of FIG. 5, each of the suggested keywords displayed in the suggested keyword display area 618 of FIG. 6 has not previously been bid upon by the current bidding entity within a predetermined time frame. Note that in the illustrated example, the suggested keywords are displayed under the heading "Bidding Entities That Bid This Keyword Also Bid:" 620.

Figure 7:
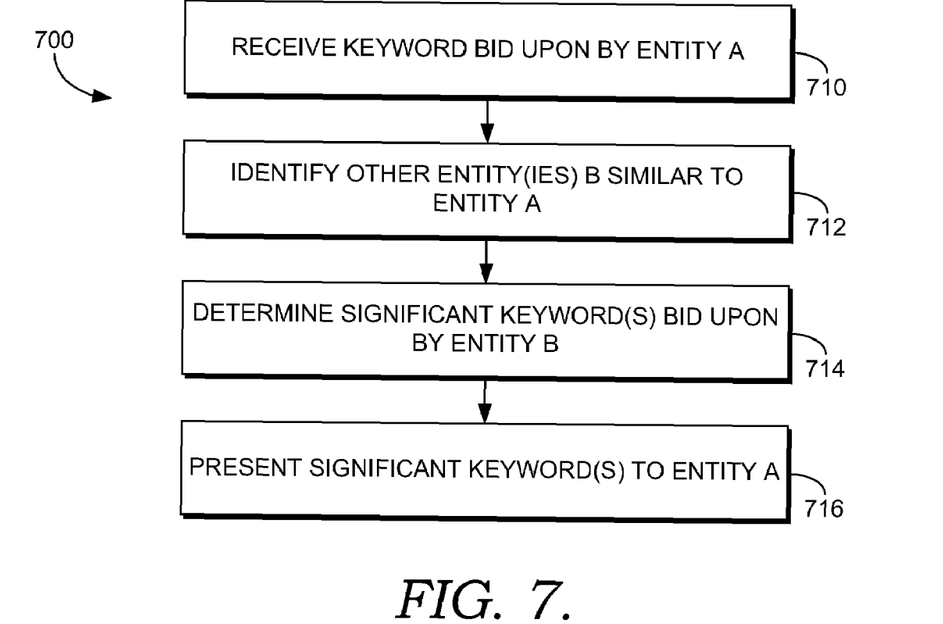
FIG. 7 is a flow diagram showing a method for recommending keywords based on keyword bid patterns determined based upon bidding entity similarity and keyword significance, in accordance with an embodiment of the present invention.

Turning now to FIG. 7, a flow diagram is illustrated showing an exemplary method 700 for recommending keywords based on bidding entity similarity, in accordance with an embodiment of the present invention. Initially, as indicated at block 710, a keyword is received that an entity A desires to bid upon. Subsequently, as indicated at block 712, at least one other entity (entity B) that is similar to entity A is identified. One manner in which an entity may be identified or determined to be similar to another entity is illustrated in the flow diagram of FIG. 8.

Figure 8:
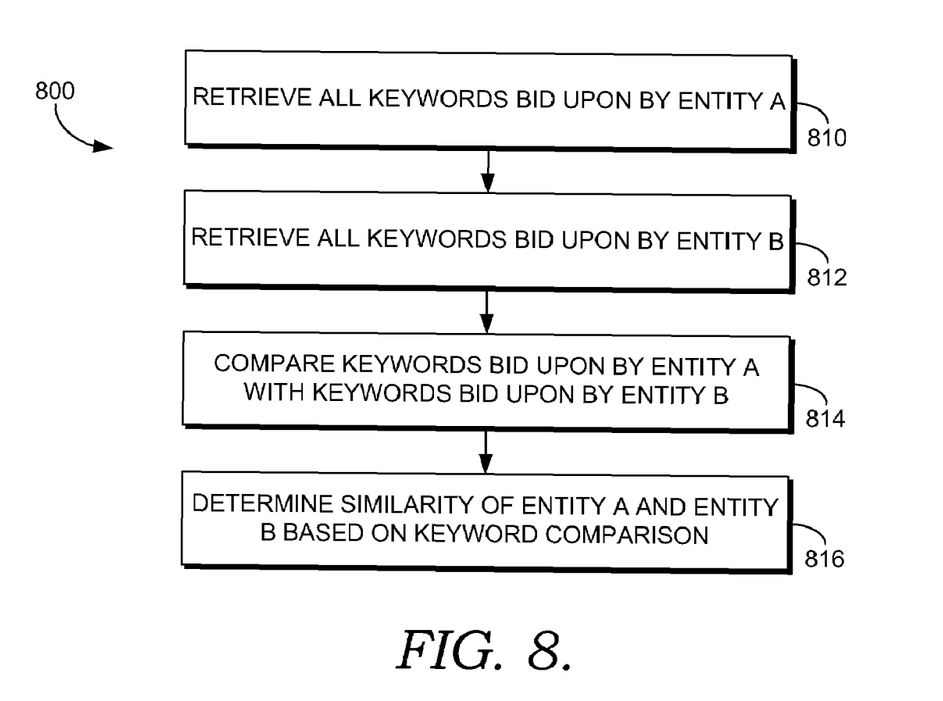
FIG. 8 is a flow diagram showing a method for determining bidding entity similarity, in accordance with an embodiment of the present invention.

FIG. 8 is a flow diagram illustrating an exemplary method 800 for determining similarity between entities, in accordance with an embodiment of the present invention. Initially, as indicated at block 810, all keywords bid upon by entity A (the entity currently bidding upon a keyword) during a predetermined time frame are determined. In one embodiment, the keywords bid upon by entity A may be retrieved from database 208 and/or server 206 of FIG. 2 (via network 204). Subsequently, all keywords bid upon by at least one other entity (entity B) during a predetermined time frame (which may be the same or different that the time frame pertaining to entity A) are determined (e.g. retrieved from database 208 and/r server 206). This is indicated at block 812. Next, the keywords bid upon by entity A and the keywords bid upon by entity B are compared with one another, as indicated at block 814. Based upon this comparison, the similarity of entities A and B is determined, e.g. utilizing the formula described hereinabove with reference to FIG. 2. In one embodiment, an entity having a similarity value exceeding a predetermined threshold may be identified as similar to entity A. In another embodiment, all entities for which similarity was examined may be identified as similar and presented in conjunction with their respective similarity values. Any and all such variations are contemplated to be within the scope of embodiments hereof.

With reference back to FIG. 7, once an entity is identified as similar to the entity currently placing a bid upon a keyword (entity A), significant keyword(s) bid upon by all entities determined to be similar to entity A are identified, e.g., utilizing the formula described hereinabove with reference to FIG. 2. This is indicated at block 714. Subsequently, the significant keyword(s) may be presented to entity A, e.g., utilizing the suggested keyword presentation component 214 of FIG. 2. This is indicated at block 716. In one embodiment, only keywords having a significance value exceeding a predetermined threshold may be presented. In other embodiments, keywords may be presented in association with their respective significance values. Any and all such variations are contemplated to be within the scope of embodiments of the present invention.

Figure 9:
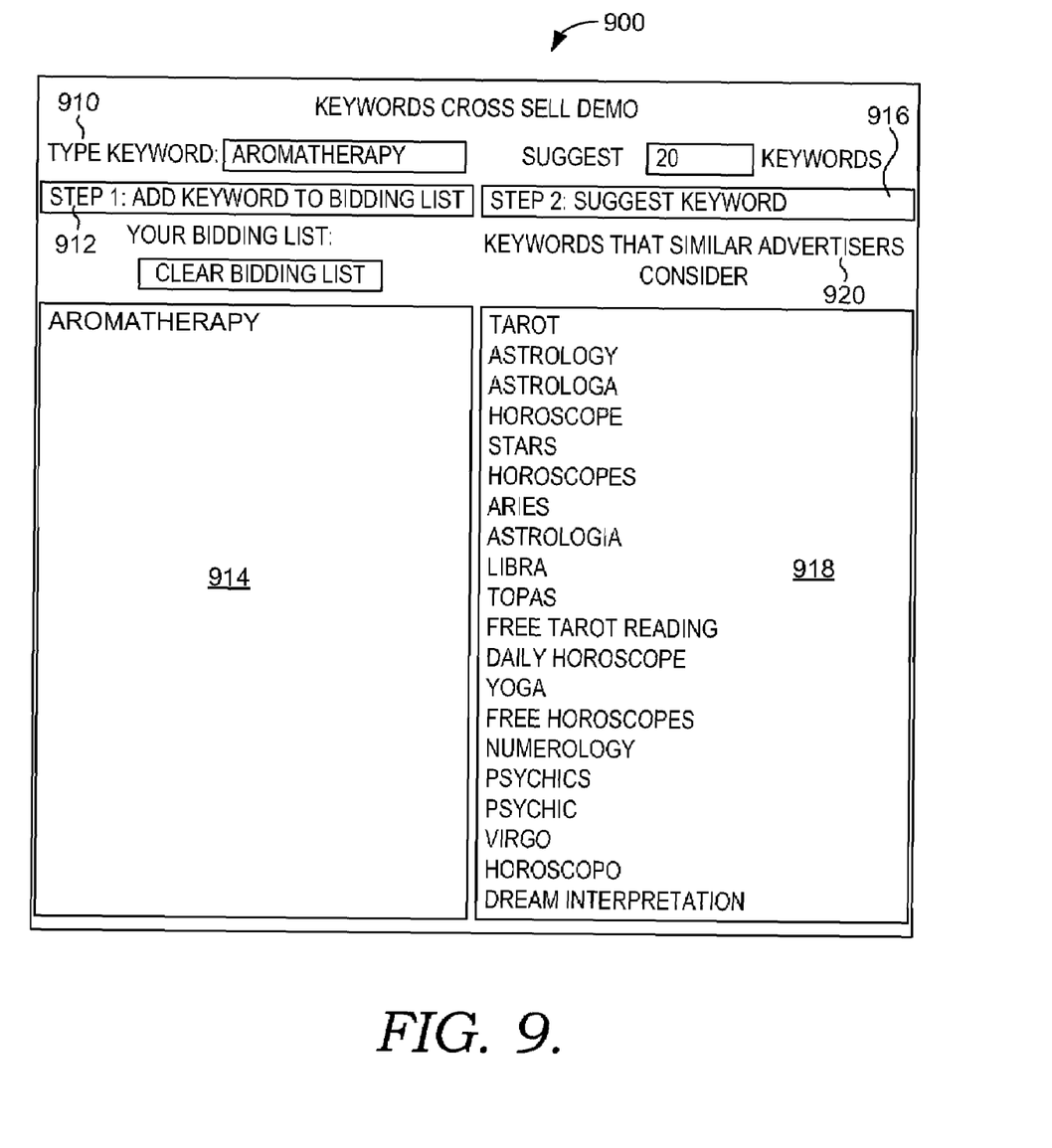
FIG. 9 is an illustrative screen display of an exemplary user interface for accepting keywords for bid and suggesting additional keywords for consideration based upon bidding entity similarity and keyword significance, wherein a single keyword has been input by a user, in accordance with an embodiment of the present invention.
Figure 10:
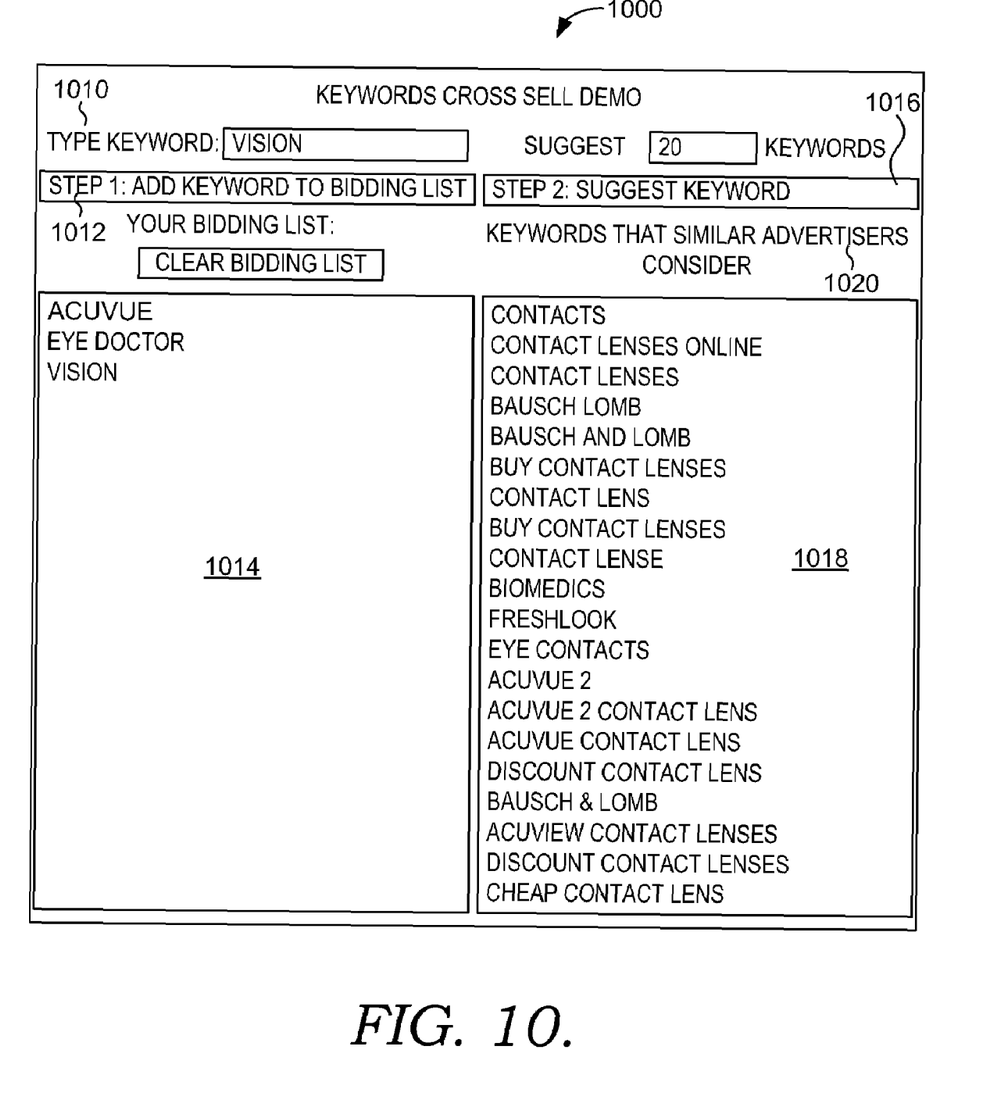
FIG. 10 is an illustrative screen display of an exemplary user interface for accepting keywords for bid and suggesting additional keywords for consideration based upon bidding entity similarity and keyword significance, wherein multiple keywords have been input by a user, in accordance with an embodiment of the present invention.

Turning now to FIGS. 9 and 10, illustrative screen displays of exemplary user interfaces for accepting one or more keywords for bid and suggesting or recommending additional keywords for consideration based upon keywords bid upon by similar bidding entities, are shown in accordance with embodiments of the present invention. In FIG. 9, a single keyword has been input for bid and in FIG. 10, a plurality of keywords has been input for bid.

With initial reference to FIG. 9, a user interface 900 is shown having a keyword input field 910 configured to receive user input regarding keywords upon which the user would like to place a bid. Upon inputting a keyword, the user may select a selectable "Step 1: Add keyword to Bidding List" button 912 such that the desired keyword may be displayed in a bid upon keyword display area 914. The user may subsequently select a selectable "Step 2: Suggest Keywords" button 916, resulting in display of a plurality of keywords in a suggested keyword display area 918. Note in FIG. 5 that the suggested keywords are displayed under the heading "Keywords That Similar Bidding Entities Consider". Accordingly, each of the keywords that is displayed in the suggested keyword display area 918 is a keyword that was bid upon by an entity determined to be similar to the bidding entity within a predetermined time (e.g., utilizing the formula described hereinabove with reference to FIG. 2) and that the bidding entity has not previously placed a bid upon.

Turning now to FIG. 10, a user interface 1000 is shown having a keyword input field 1010 configured to receive user input regarding keywords upon which the user would like to place a bid, keyword input field 1010 being identical to keyword input field 910 of FIG. 9. Upon inputting a keyword, the user may select a selectable "Step 1: Add Keyword to Bidding List" button 1012 such that the desired keyword may be displayed in a bid upon keyword display area 1014 (bid upon keyword display area 1014 being identical to bid upon keyword display area 914 of FIG. 9). In the example illustrated in FIG. 10, the user has input a plurality of keywords to bid upon. Thus, when the user selects the selectable "Step 2: Suggest Keywords" button 1016, the resulting display of keywords in the suggested keyword display area 1018 are keywords that have at some point within a predetermined time frame, been bid upon by at least one entity determined to be similar to the bidding entity, such similarity being determined with reference to each of the plurality of keywords the bidding entity is currently bidding upon. Additionally, as with the suggested or recommended keyword listing of FIG. 9, each of the suggested keywords displayed in the suggested keyword display area 1018 of FIG. 10 has not previously been bid upon by the current bidding entity within a predetermined time frame. Note that in the illustrated example, the suggested keywords are displayed under the heading "Keywords That Similar Bidding Entities Consider:" 1020.

As can be understood, embodiments of the present invention relate to techniques for cross-selling keywords among keyword bidding entities (e.g., advertisers) based upon bidding patterns. For instance, a keyword suggestion tool in accordance with an embodiment of the present invention, upon receipt of a first keyword, may examine all additional keywords that have been paired with the first keyword in the bidding patterns of other advertising entities and recommend one or more of the paired keywords to the bidding entity for consideration. In other embodiments, a keyword suggestion tool in accordance with the present invention, upon receipt of a keyword from a first advertising entity, may examine the bidding pattern of the first advertising entity in comparison to the bidding patterns of other advertising entities to identify advertising entities that are similar to the bidding entity. Recommendations may then be made to the first advertising entity based upon keywords that the identified similar advertising entities have bid The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

What is claimed is:

1. A computerized system for recommending keywords, the computerized system comprising:

a processor for executing one or more machine-executable instructions embedded in a memory,     the executed one or more machine-executable instructions comprising:

a keyword receiving component to receive at least one keyword bid upon by a first entity;

a bid pattern determining component to determine a bid pattern associated with the first entity and each of a plurality of other entities in response to the received at least one keyword;

a confidence value determining component to determine at least one second keyword bid upon by at least one of the plurality of other entities and to calculate for each determined at least one second keyword a confidence value, wherein each determined at least one second keyword is paired with the received at least one keyword and is derived from the determined bid pattern, and wherein the confidence value of each determined at least one second keyword is based on a frequency of bidding on each determined at least one second keyword by one or more entities that bid on both the at least one keyword and each determined at least one second keyword, and a frequency of bidding on each determined at least one second keyword irrespective of association with the at least one keyword;

an entity similarity determining component to determine at least one other entity that is similar to the first entity by retrieving all keywords bid upon by the first entity, retrieving all keywords bid upon by each of the plurality of other entities, comparing the keywords bid upon by each of the plurality of other entities to all keywords bid upon by the first entity, and determining at least one of the plurality of other entities that is similar to the first entity if similarity between the keywords bid upon by the first entity and the keywords bid upon by the at least one of the plurality of other entities exceeds a determined threshold; and a suggested keyword presentation component to present suggested keywords to the first entity, wherein the presented suggested keywords include one or more keywords having confidence values that exceed a predetermined threshold and one or more keywords from the determined at least one of the plurality of other entities that is similar to the first entity.

2. The computerized system of claim 1, wherein the suggested keyword presentation component displays suggested keywords to the first entity on a display device associated with a user computing device.

3. The computerized system of claim 1, wherein the bid pattern determining component determines the bid pattern associated with the first entity by:
- determining all keywords bid upon by any of the plurality of entities;
- determining a frequency for each of the keywords;
- determining all pairs of keywords bid upon by any of the plurality of entities; and
- determining a frequency for each of the pairs of keywords.

4. The computerized system of claim 1, further comprising a keyword significance determining component to determine a significance associated with each keyword bid upon by each of the plurality of other entities that is similar to the first entity.

5. The computerized system of claim 4, wherein the keyword significance determining component determines the significance of a keyword by:
- determining frequency of all keywords bid upon by each of the plurality of other entities that is similar to the first entity;
- determining if the frequency of each keyword bid upon by each of the plurality of other entities that is similar to the first entity exceeds a pre-determined threshold.

6. The computerized system of claim 5, wherein each keyword bid upon by each of the plurality of other entities that is similar to the first entity that exceeds the predetermined threshold is displayed on a display device associated with a user computing device in association with a value representative of the significance of the keyword.

7. One or more computer-readable media having computer-executable instructions embodied thereon that, when executed by a computer, perform a method comprising:
- receiving at least one keyword bid upon by a first entity;
- determining a bid pattern associated with the first entity and each of a plurality of other entities;
- determining at least one second keyword bid upon by at least one of the plurality of other entities and calculating for each determined at least one second keyword a confidence value, wherein each determined at least one second keyword is paired with the received at least one keyword and is derived from the determined bid pattern, and wherein the confidence value of each determined at least one second keyword is based on a frequency of bidding on each determined at least one second keyword by one or more entities that bid on both the at least one keyword and each determined at least one second keyword, and a frequency of bidding on each determined at least one second keyword irrespective of association with the at least one keyword;
- determining at least one other entity that is similar to the first entity by retrieving all keywords bid upon by the first entity, retrieving all keywords bid upon by each of the plurality of other entities, comparing the keywords bid upon by each of the plurality of other entities to all keywords bid upon by the first entity, and determining at least one of the plurality of other entities that is similar to the first entity if similarity between the keywords bid upon by the first entity and the keywords bid upon by the at least one of the plurality of other entities exceeds a predetermined threshold; and
- presenting suggested keywords to the first entity, wherein the presented suggested keywords include one or more keywords having confidence values exceed a predetermined threshold and one or more keywords from the determined at least one of the plurality of other entities that is similar to the first entity.

\* \* \* \* \*

UNITED STATES PATENT AND TRADEMARK OFFICE
CERTIFICATE OF CORRECTION

| | | |
|---|---|---|
| PATENT NO. | : 7,689,548 B2 | Page 1 of 1 |
| APPLICATION NO. | : 11/534567 | |
| DATED | : March 30, 2010 | |
| INVENTOR(S) | : Ying Li et al. | |

It is certified that error appears in the above-identified patent and that said Letters Patent is hereby corrected as shown below:

In column 12, line 66, in Claim 1, delete "determined" and insert -- predetermined --, therefor.

Signed and Sealed this
Eighth Day of February, 2011

David J. Kappos
*Director of the United States Patent and Trademark Office*